April 6, 1965 W. A. OMOHUNDRO ETAL 3,176,447
AIR PURIFIER
Filed June 7, 1961 3 Sheets-Sheet 2

Inventors:
William A Omohundro,
Peter Kranz,
by Leonard J Platt
Their Attorney.

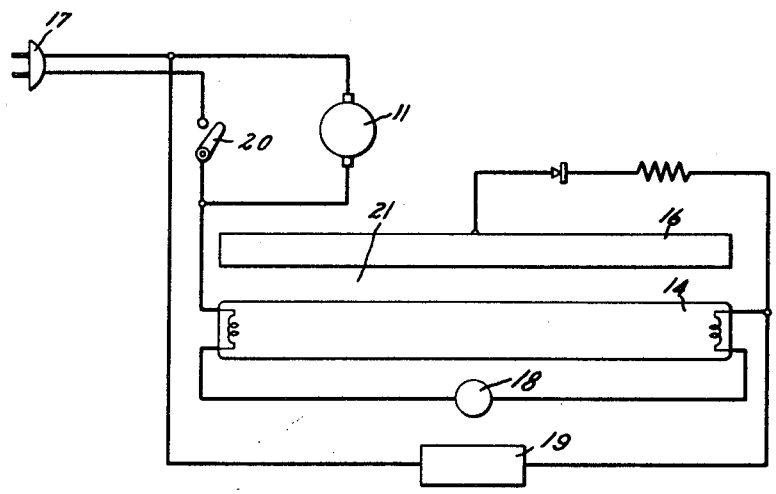

3,176,447
AIR PURIFIER
William A. Omohundro, Westport, and Peter Kranz, Darien, Conn., assignors to General Electric Company, a corporation of New York
Filed June 7, 1961, Ser. No. 115,348
5 Claims. (Cl. 55—279)

This invention relates to an air purifier, and more particularly to a unique air filtering arrangement and to the combination of such a filtering arrangement with an ultra-violet lamp for destroying bacteria and generating negative ions.

Electric fan forced room air filter arrangements provide a valuable addition to the art of conditioning and purifying room air but the extent of their use depends to a very great degree on their effectiveness in removing small and large dust particles and in deodorizing the air. Ion generators also provide a valuable addition to the art of conditioning the air within a room or enclosure, and it has been established that the effectiveness of a room ion generator depends upon the number of relatively small negative ion particles which are discharged into a room and are maintained within the room. It has been found that one of the problems which has heretofore reduced the effectiveness of negative ion generators is the presence of relatively large air borne particles and the presence of too great a number of air borne particles, both within the ion generator and with the room. During such adverse conditions, effective ion generation is reduced since ineffective relatively large particles are ionized thereby decreasing the number of effective small particles which become ionized and some of the small effective ions which are generated become neutralized by coming into contact with neutral or positively charged air borne particles. An arrangement is especially desirable for removing dust particles from the air while permitting an adequate number of water molecules to remain in the air which flows through the ion generator.

Accordingly, it is a primary object of this invention to provide an improved combination ion generating and air filtering arrangement in which a unique filter is so related to an ion generator that a maximum number of small effective ions are generated and are maintained within a room or other enclosure by suitably controlling the number and size of air borne particles which pass through the ion generator and the number and size of air borne particles within the room.

It is a further object of this invention to provide an improved filter arrangement which is capable of effectively removing dust, smoke and odor from a room or other enclosure.

A still further object of this invention is to provide an improved combination filter and ultra-violet lamp for effectively removing, destroying or neutralizing bacteria and other room air contaminants.

In accordance with one of the aspects of this invention, an ion generator comprising an ultra-violet light source and an electron emitting plate is positioned within an air purifier housing and a unique filter is located for filtering the air before it passes to the ion generator. The filter is constructed to remove most air borne particles and to permit air and water molecules to pass therethrough. With this arrangement, an adequate number of small water particles are passed to the ion generator, become ionized and are discharged within the room. However, the filter effectively limits the number of particles which reach the ionizing chamber and which are maintained within the room to thereby permit effective ions to be generated and to prevent the ions which are generated from being neutralized by coming into contact with neutral or positively charged particles within the air purifier or in the room.

In accordance with a further aspect of this invention, a unique filter arrangement is located adjacent to the air inlet of the air purifier. The arrangement includes a relatively coarse foam pad filter for filtering most air borne particles above 10 microns in size. For illustration, a particle 10 microns in size is approximately the minimum size particle that the eye can see in a beam of sunlight. A superfine glass fiber filter pad is located down stream from the foam pad filter for removing more than 90% of all air borne particles above 1.5 microns in size; and effectively removing smoke particles, and a layer of activated charcoal is arranged in the air purifier down stream from the superfine glass fiber filter for removing gases and deodorizing the air which passes through the coarse and fine filter pads. Thus, an extremely effective room air filter and deodorizer is achieved.

Other objects and advantages of this invention will be apparent from the following description taken in connection with the accompanying drawings in which:

FIG. 4 is a circuit diagram for the air purifier illustrated in FIG. 1.

Figure 1:
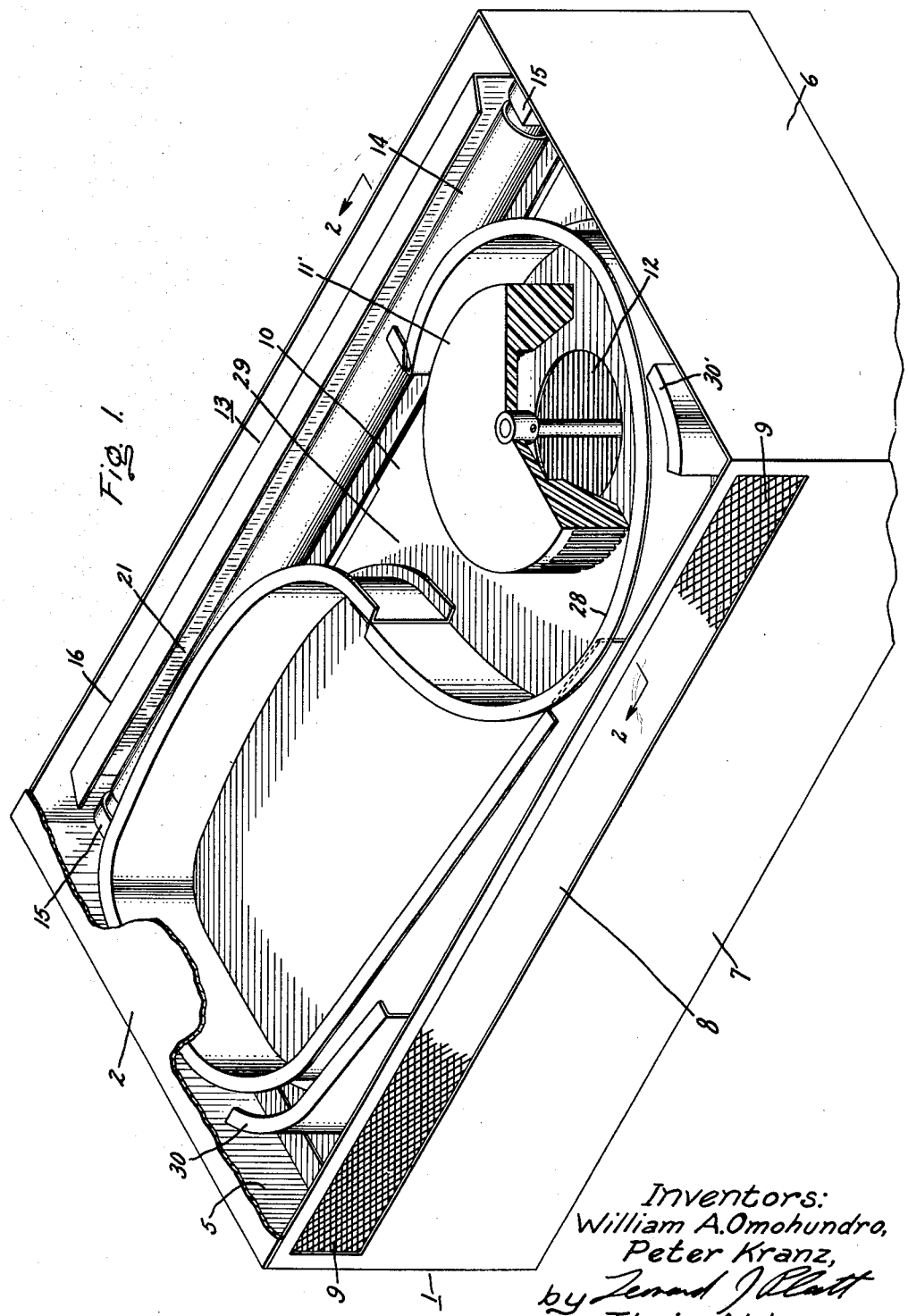
FIG. 1 is a perspective view of the air purifier embodying the invention, partly broken away to show the ion generating unit.
Figure 2:
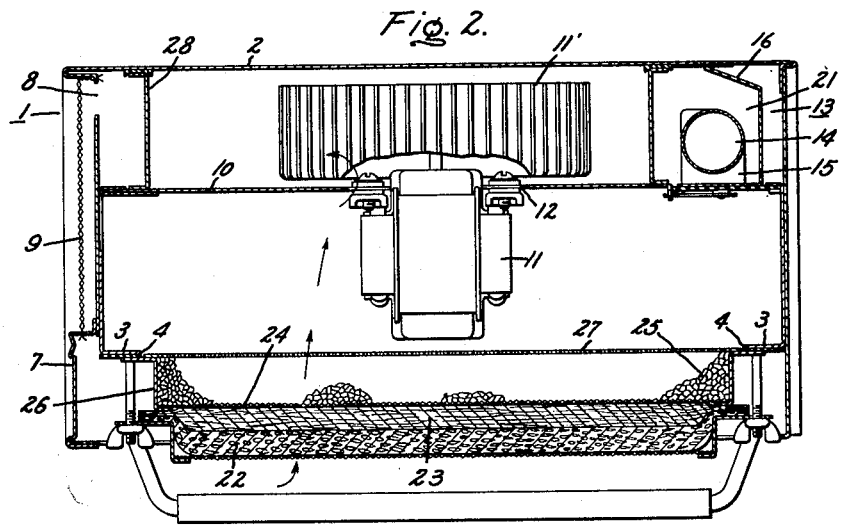
FIG. 2 is a section view of the air purifier taken substantially on the plane 2—2 of FIG. 1.

Referring now to FIGS. 1 and 2 of the drawings, there is illustrated an air purifier comprising a housing or casing 1 which suitably encloses the operative parts of the air purifier. The casing 1 is preferably made of sheet metal and includes a top wall 2, shown broken away for purposes of illustration, a bottom wall 3 having an enlarged opening 4 formed therein, side walls 5 and 6 and a front wall 7. The front wall 7 is formed with an air discharge opening 8 which may be provided with a suitable grille 9. The air purifier includes an intermediate barrier wall 10. As shown in FIGS. 1 and 2 the barrier wall is arranged generally parallel to the top wall 2 and the substantially open bottom wall 3. A motor 11 for driving a fan 11' is mounted on the barrier wall and as shown more particularly in FIG. 1 a suitable circular air opening 12 is provided in the barrier wall for permitting the fan to propel air from the enlarged opening 4 formed in the bottom wall, through opening 12, to the ion generator generally indicated by reference numeral 13, and out of the casing, in a manner to be more particularly described hereinafter.

In the air purifier illustrated, a tubular ultra-violet ray lamp 14 is provided as a source of irradiation for the ion generator 13 and for destroying harmful bacteria. As shown, the lamp 14 is suitably mounted at the rear of the casing between vertically disposed electrode supporting brackets 15. The ion generator also includes an elongated metal plate 16 for emitting electrons when it is bombarded by photons from the ultra-violet ray lamp 14.

Referring now to the circuit diagram of FIG. 4, it is evident that the ultra-violet lamp 14 may be suitably connected to a standard 120 volt 60 cycle alternating current source by a conventional plug connector 17. A starter 18 and a ballast 19 are also connected in the circuit in a conventional manner for properly energizing the ultra-violet lamp 14. As shown, fan motor 11 is connected in parallel with the ultra-violet lamp 14 and a switch 20 is provided for simultaneously energizing the fan motor and the ultra-violet lamp.

With this arrangement, as shown in FIG. 1, photons from lamp 14 may bombard plate 16 to cause electrons to leave the plate and follow electrostatic lines of force in an air gap 21 between the plate 16 and the lamp 14.

It is believed that these electrons attach themselves to oxygen and nitrogen molecules which are present in the air gap 21 to form oxygen and nitrogen ions. These ionized molecules attract water molecules and it appears that approximately ten molecules of water may be united with one of these ionized oxygen or nitrogen molecules to form an air borne ionized particle. The details of the ion generator are more particularly described in the co-pending application of George Dickinson and William A. Omohundro, Serial No. 115,349, filed June 7, 1961, and assigned to the present assignee.

Figure 3:
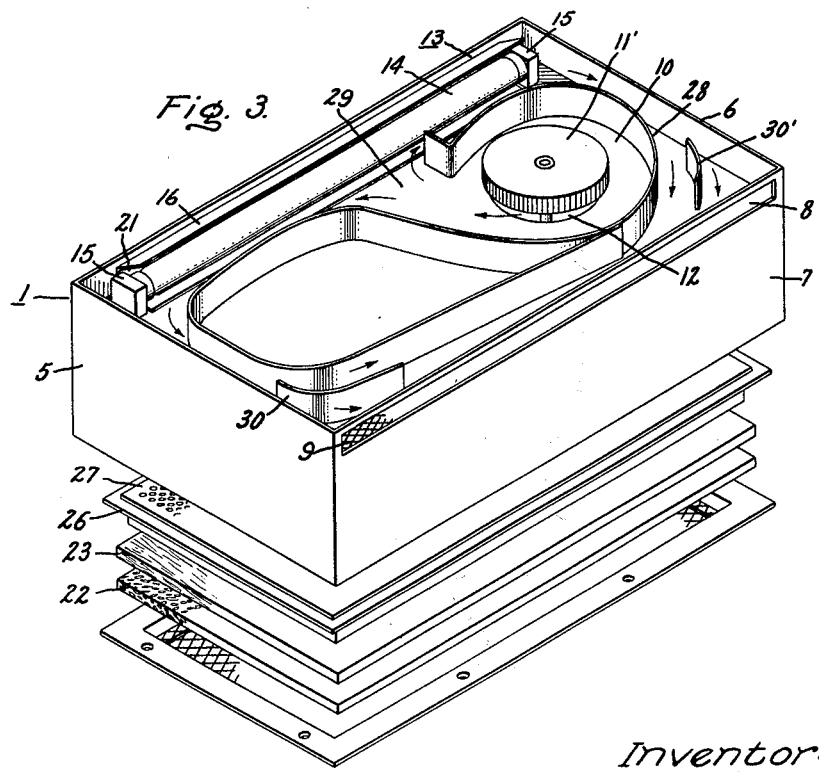
FIG. 3 is an exploded view of the improved air purifier.

As shown more particularly in FIGS. 2 and 3, a unique arrangement is provided for filtering the air before it reaches the ion generating air gap 21 in order to suitably control the number and size of the particles which pass through the air gap. A coarse filter pad 22 is arranged for filtering air borne particles above 10 microns in size. As shown, the filter is generally rectangular in shape and is approximately the same size as the opening 4 which is provided in the bottom of the air purifier housing. The filter may be formed of foam or other suitable material, and in the embodiment illustrated is approximately ⅜" thick and has air bubbles or openings which vary in size from approximately .010 inch to .040 inch. This filter traps dirt and dust particles and since the filter is preferably formed of foam polyurethane it is readily washable and can be quickly cleaned and replaced thereby decreasing the shut down time of the improved air purifier. Thus, a very effective first stage filter is achieved.

In accordance with the invention a superfine glass fiber filter 23 is positioned directly above the coarse filter 22. As shown, the glass fiber filter is also rectangular and is arranged to cover the air inlet opening 4 down stream from the coarse filter 22. In the embodiment illustrated, the glass fiber filter pad is approximately ⅜" thick and consists of very fine fibers with a mean diameter of approximately one micron. By this arrangement, the glass fiber filter pad effectively removes more than 90% of all of the air borne particles above 1.5 microns in size which are passed through the coarse filter 22. Accordingly, most of any smoke particles and most condensation nuclei are removed from the air by the fiber glass filter while the filter permits desirable water and air molecules to be passed therethrough.

As shown in FIG. 2, a perforated plate 24 is provided for substantially increasing the efficiency of the superfine glass fiber filter 23. In the embodiment illustrated, the holes in plate 24 are approximately .058" in diameter and are spaced approximately .93" apart. With this arrangement the air flows upwardly and laterally through the filter and then through one of the openings formed in plate 24, thereby providing a very effective air flow pattern through the filter. An activated charcoal bed 25 is provided for removing odors and other gases from the air. As shown in FIG. 2, a sheet metal container 26 comprising a perforated top wall 27 and the previously mentioned perforated plate 24 is provided for suitably holding the activated charcoal. While the amount and size of charcoal may be varied, it has been found that 2½ pounds of granular activated charcoal between .090 and .130 inch in size is very effective in removing room odors. By this arrangement, the unique combination of filters remove practically all dirt particles above 10 microns in size and more than 90% of all dirt particles above 1.5 microns. With such a limited flow of particles, the water and air molecules which flow from the filters are ionized in the air gap and are not subsequently thrown into contact with dust and dirt particles of condensation nuclei and thereby neutralized. In addition, the filters reduce the number of air borne particles within the room to such a level that the small ionized particles which are discharged from the air purifier are not quickly neutralized or adsorbed by coming into contact with neutral or positively charged air borne particles within the room. Moreover, the improved filter arrangement effectively traps most bacteria. Thus, the ultra-violet lamp 14 can effectively destroy the bacteria which are not trapped by the filters to thereby provide a flow of clean air through the discharge opening 8.

In accordance with this invention, a unique baffle arrangement is provided for shielding the ultra-violet ray lamp from view through air discharge opening 8, for suppressing any noise from fan 11', and for causing two streams of air to flow with respect to the ultra-violet lamp 14. As shown more particularly in FIG. 1, a generally circular baffle wall 28 partially encloses the fan 11' except for an air discharge opening 29 which is provided at the central portion of the ultra-violet lamp 14. This baffle wall 28 extends to the left from the opening 29 along the left portion of the ultra-violet lamp 14, then forwardly generally parallel to side wall 5, it curves to the right, and then extends generally parallel to the front wall 7. Baffle walls 30 and 30' are provided at the left and right front corners of the air purifier for achieving a smooth flow of air around these corners. With this construction, air is drawn through the filters 22, 23 and 25, and through opening 12 under the influence of fan 11'. As the air leaves the fan, it is directed rearward by the baffle wall 28 to the central portion of the ultra-violet lamp 14 where it is split into two streams. One stream flows to the left through a left ionizing air gap between the plate 16 and the ultra-violet tube 14, it is discharged from the air gap, flows forwardly along the left side wall 5, and is directed by the baffle walls 28 and 30 out of the casing through opening 9. The other air stream flows to the right through a right air gap between the ultra-violet lamp 14 and the plate 16, it is discharged from this air gap, and flows forwardly along the right wall of the casing and out through opening 8. By this reverse air flow arrangement, most of the noise from the fan is effectively suppressed, and the baffle walls being located between the ultra-violet lamp 14 and the air discharge opening 8 effectively prevent the rays from the ultra-violet lamp from being viewed through the opening 8.

While there has been shown and described a specific embodiment of the invention it is not desired that the invention be limited to the particular form shown and described, and it is intended by the appended claims to cover all such changes and modifications as fall within the true spirit and scope of the invention.

What we claim is:

1. An air purifier comprising a vertically shallow casing having upstanding front and rear walls and generally horizontal bottom and top walls, said bottom wall being substantially open to define an enlarged air inlet, an air discharge opening formed in the top portion of said front wall, an elongated ultra-violet lamp located in the upper rear portion of said casing and extending generally parallel to said rear wall, an elongated electron emitting plate arranged generally parallel to said ultra-violet lamp between said lamp and said rear wall, baffle means positioned in the upper portion of said casing between said air discharge opening and said lamp, a coarse filter positioned across said air inlet having openings which vary in size from approximately .010 inch to .040 inch, a superfine filter arranged generally parallel to said first filter and formed of fibers having a mean diameter of approximately one micron, a layer of material arranged generally parallel to said filters and spaced downstream therefrom to deodorize the air which passes through the filters, and a fan positioned in the top portion of said casing between said lamp and said baffle walls for drawing air through said filters, between said plate and said lamp, along said baffle and through the discharge opening.

2. An air purifier comprising a casing having upstanding front and rear walls and generally horizontal bottom and top walls, a barrier wall spaced from said top wall and arranged generally parallel thereto, an air opening formed in said barrier wall, an air discharge opening formed in the top portion of said front wall above said barrier wall, a fan positioned in the top portion of said casing spaced from said rear wall above the opening in said barrier wall for drawing air into the upper portion of the casing, an ultra-violet lamp located in the upper portion of said casing extending generally parallel to and adjacent said rear wall between the rear wall and the fan, baffle means positioned in the upper portion of said casing extending perpendicularly between said barrier wall and said top wall for directing air from said fan rearward along said lamp and then forwardly to the air discharge opening, said bottom wall being substantially open to define an enlarged air inlet, and filter means positioned across said air inlet, said filter means including a foam filter having openings which vary in size from approximately .010 to .040 inch and a superfine filter made of fibers having a mean diameter of approximately one micron.

3. An air purifier comprising a casing having upstand-front and rear walls and generally horizontal bottom and top walls, a barrier wall spaced from said top wall, an air opening formed in said barrier wall, an air discharge opening formed in the top portion of said front wall above said barrier wall, a fan positioned in the top portion of said casing spaced from said rear wall above the opening in said barrier wall for drawing air into the upper portion of the casing, an ultra-violet lamp located in the upper portion of said casing, baffle means positioned in the upper portion of said casing extending perpendicularly between said barrier wall and said top wall for directing air from said fan along said lamp and then to the air discharge opening, said bottom wall being substantially open to define an enlarge air inlet, and filter means positioned across said air inlet to remove practically all dirt particles above ten microns in size and more than 90% of all particles above 1.5 microns in size while permitting water and air molecules to pass therethrough so that such molecules may become ionized passing between said lamp and said plate, said filter means including a filter having openings which vary in size from approximately .010 to .040 inch, a superfine filter made of fibers having a mean diameter of approximately one micron, and a perforated plate positioned downstream from said superfine filter and having holes approximately .06 inch in diameter and spaced less than one inch apart.

4. An air purifier comprising a casing having upstanding left, right, front and rear walls and a generally horizontal top wall; a barrier wall spaced downwardly from said top wall and arranged generally parallel thereto; an air opening formed in said barrier wall; filter means positioned in said casing for filtering air drawn into said opening; an air discharge opening formed in the top portion of said front wall above said barrier wall; a fan positioned in the top portion of said casing above the opening in said barrier wall for drawing air into the upper portion of the casing; an ultra-violet ray tube located in the upper portion of said casing extending generally parallel to said rear wall; baffle means positioned in the upper portion of said casing between said air discharge opening and said ultra-violet ray tube; said baffle means including generally curved walls extending in perpendicular relation to the top wall and the barrier wall and surrounding said fan except for an opening directing air at the central portion of the ultra-violet tube; said curved walls being spaced from said tube and said left, right and front walls so that the air is separated into two streams, one flowing leftward along the left portion of said ultra-violet tube, then forward along said left wall and out through the air discharge opening, and the other stream flowing to the right along the right portion of said ultra-violet ray tube, then forward along said right wall of said casing and out through the air discharge opening.

5. An air purifier comprising a casing having upstanding front and rear walls, two side walls, and a generally horizontal top wall; a barrier wall spaced downwardly from said top wall and arranged generally parallel thereto; an air opening formed in said barrier wall offset from the center of the barrier wall so as to be adjacent one of said side walls; an elongated air discharge opening formed in the top portion of said front wall above said barrier wall; a fan positioned in the top portion of said casing above the opening in said barrier wall for forcing air into the upper portion of the casing; an elongated ultra-violet lamp located in the upper portion of said casing and extending generally parallel to and adjacent to said rear wall and between the rear wall and said fan; baffle means positioned in the upper portion of said casing between said air discharge opening and said ultra-violet lamp; said baffle means including a generally circular wall extending between said barrier wall and said top wall and surrounding said fan except for an air discharge opening directing the air towards the middle section of said ultra-violet lamp; said circular wall being positioned adjacent to but spaced from one end of said lamp and extending adjacent to but spaced from one of said side walls and said front wall; said baffle means further including a curved wall extending in perpendicular relation to said barrier wall and said top wall and extending adjacent to but spaced from the other end of said ultra-violet lamp, the other side wall and the front wall whereby the air directed toward the central portion of the lamp is separated into two streams, one flowing along one end portion of said lamp, then forward between one side wall and said circular wall then out through the air discharge opening, and the other stream flowing along the other end of said lamp, then forward between the other side wall and said curved baffle wall, and then out through the air discharge opening.

References Cited by the Examiner

UNITED STATES PATENTS

| | | | |
|---|---|---|---|
| 2,195,565 | 4/40 | Fricke | 55—486 |
| 2,251,964 | 8/41 | Stackhouse | 55—501 |
| 2,449,681 | 9/48 | Wilson | 55—104 |
| 2,628,083 | 2/53 | Rense | 55—279 XR |
| 2,638,644 | 5/53 | Rauhut | 55—234 |
| 2,651,383 | 9/53 | Yonkers | 55—102 |
| 2,855,641 | 10/58 | Stein | 55—279 |
| 2,945,554 | 7/60 | Berly | 55—279 |
| 2,999,562 | 9/61 | Lechtenberg | 55—502 |

FOREIGN PATENTS

| | | |
|---|---|---|
| 65,635 | 9/47 | Denmark. |
| 516,277 | 1/31 | Germany. |

HARRY B. THORNTON, *Primary Examiner.*

HERBERT L. MARTIN, *Examiner.*